United States Patent [19]

Basinger et al.

[11] Patent Number: 4,678,173

[45] Date of Patent: Jul. 7, 1987

[54] APPARATUS FOR AUTOMATICALLY AND CONTINUOUSLY FEEDING AND FOLDING TEXTILE ARTICLES

[75] Inventors: David M. Basinger, Kannapolis; Gary L. Hatley, Stanley; Billy J. Kiser, Concord; James N. Moser, Kannapolis, all of N.C.

[73] Assignee: Fieldcrest Cannon, Inc., Eden, N.C.

[21] Appl. No.: 807,869

[22] Filed: Dec. 11, 1985

[51] Int. Cl.⁴ .................................................. B42C 1/00
[52] U.S. Cl. .......................................... 270/45; 271/9; 271/18.3; 493/419
[58] Field of Search .................... 270/45, 32, 51, 58; 493/416, 419; 271/9, 18, 18.3, 155; 294/61

[56] References Cited

U.S. PATENT DOCUMENTS

| Re. 30,084 | 8/1979 | Morton . | |
|---|---|---|---|
| 3,255,569 | 6/1966 | Hannon et al. | 270/45 X |
| 3,285,649 | 11/1966 | Harton . | |
| 3,542,241 | 11/1970 | Middleditch . | |
| 3,645,525 | 2/1972 | Ishihara et al. . | |
| 3,744,785 | 7/1973 | Grantham . | |
| 3,813,094 | 5/1974 | Walton et al. | 271/18.3 X |
| 3,877,695 | 4/1975 | Carrol | 271/18 |
| 3,879,031 | 4/1975 | Melechan . | |
| 4,002,332 | 1/1977 | Hoenigmann . | |
| 4,103,884 | 8/1978 | Kawashima . | |
| 4,153,240 | 5/1979 | Gouley . | |
| 4,311,304 | 1/1982 | Hamada et al. . | |
| 4,312,617 | 1/1982 | Livingston et al. . | |
| 4,392,766 | 7/1983 | Blunt . | |
| 4,464,159 | 8/1984 | Grantham . | |
| 4,482,143 | 11/1984 | Torre | 271/18.3 |
| 4,516,762 | 5/1985 | Moltrasio et al. | 271/18.3 X |

FOREIGN PATENT DOCUMENTS

| 156756 | 10/1985 | European Pat. Off. | 271/18.3 |
|---|---|---|---|
| 3437015 | 7/1985 | Fed. Rep. of Germany | 271/18.3 |
| 226539 | 8/1985 | German Democratic Rep. | 271/18.3 |

Primary Examiner—E. H. Eickholt
Attorney, Agent, or Firm—Bell, Seltzer, Park & Gibson

[57] ABSTRACT

An apparatus is provided for automatically and continuously feeding and folding successive textile articles, such as towels and the like, from a supply stack of such textile articles. The apparatus includes a supply mechanism for successively receiving a first stack of textile articles in a non-feeding position, moving the first stack into a feeding position, and receiving a second supply stack of textile articles in a non-feeding position for being moved into the feeding position when the first stack of textile articles is depleted. A folding mechanism successively receives the textile articles and folds the textile articles in the desired folded condition. A robot feeding mechanism with an end effector mechanism designed in accordance with this invention is positioned adjacent the supply mechanism for successively picking-up one textile article only from the top of the stack of textile articles in the feeding position and transporting the textile articles therefrom to the folding mechanism and releasing the textile articles.

15 Claims, 17 Drawing Figures

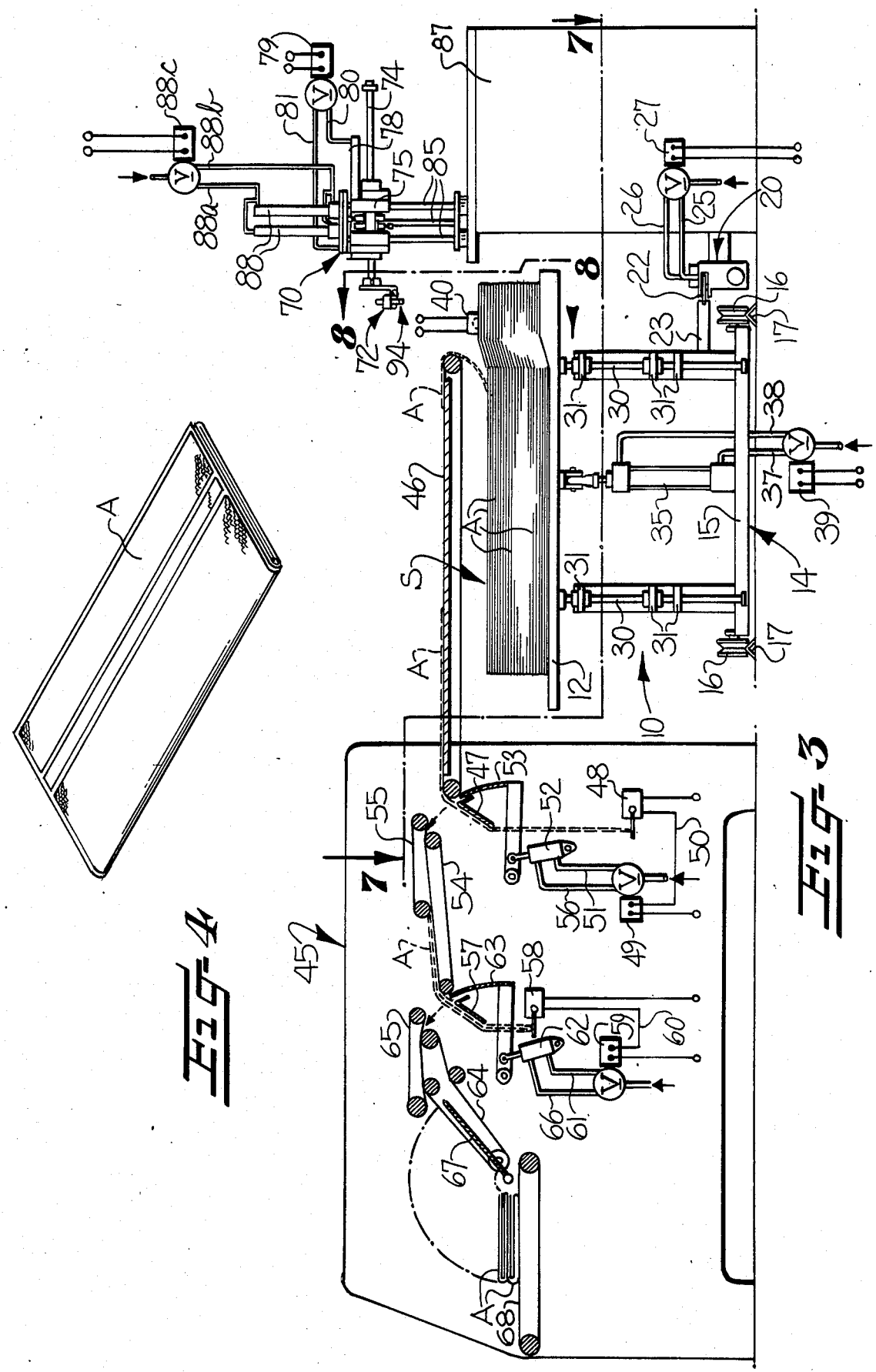

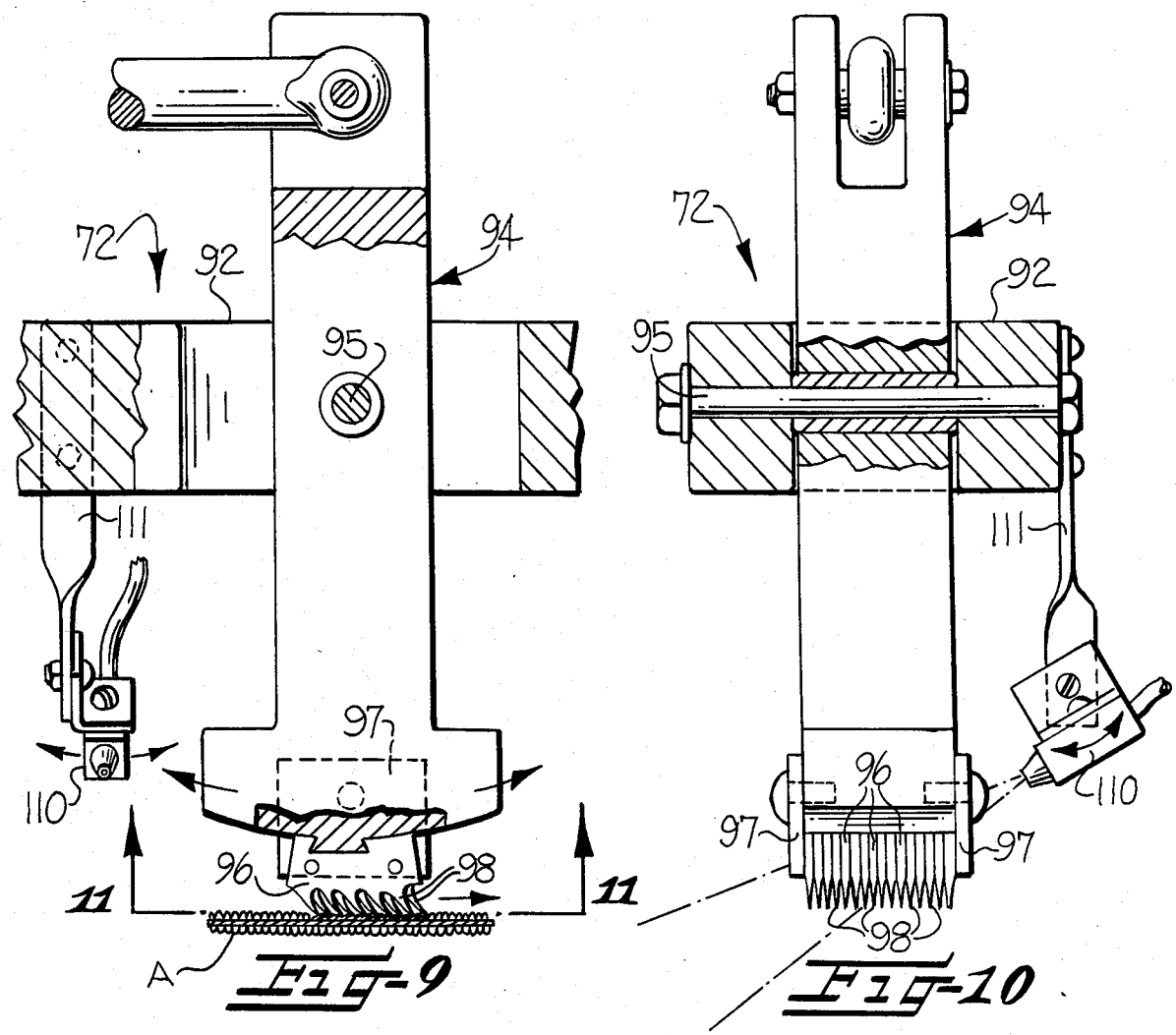
Fig-9
Fig-10
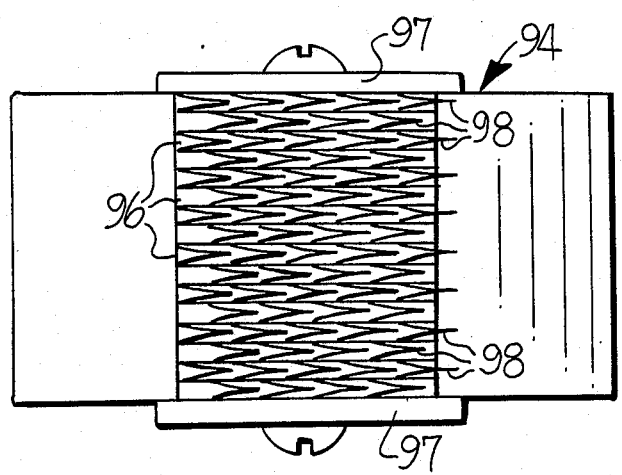
Fig-11
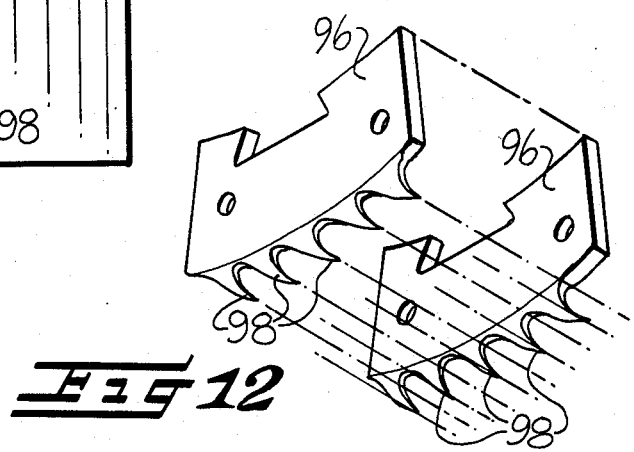
Fig-12

APPARATUS FOR AUTOMATICALLY AND CONTINUOUSLY FEEDING AND FOLDING TEXTILE ARTICLES

FIELD OF THE INVENTION

This invention relates to an apparatus for automatically and continuously feeding and folding successive textile articles, such as towels and the like, from a supply stack of such textile articles.

BACKGROUND OF THE INVENTION

Heretofore, it has been the practice to fold textile articles, particularly towels and the like, to be suitably packaged for subsequent shipment and sale. These textile articles were taken in stacks to a folding mechanism where an operator manually fed the individual textile articles successively into the folding mechanism for folding the textile articles into the desired folded condition.

This type of operation was excessive in operator time and expense because of the manual steps required.

OBJECT AND SUMMARY OF THE INVENTION

It is the object of this invention to automate the above described operations and to eliminate excessive operator time and expense by providing an apparatus for automatically and continuously feeding and folding successive textile articles from a supply stack of such textile articles.

By this invention, it has been found that this object may be accomplished by providing an apparatus for automatically and continuously feeding and folding successive textile articles from a supply stack of such textile articles which includes generally the following.

A supply mechanism is provided for successively receiving a first supply stack of the textile articles in a non-feeding position, moving the first stack of textile articles into a feeding position, and receiving a second supply stack of textile articles in a non-feeding position for being moved into the feeding position when the first stack of textile articles is depleted.

Preferably, this supply mechanism includes first and second table devices for respectively receiving the first and second supply stacks of textile articles. A movable carriage carries the two table devices together in side-by-side position for horizontal forward and reverse movement between a first position in which the first table device is in the feeding position and the second table device is in the non-feeding position and a second position in which the first table device is in the non-feeding position and the second table device is in the feeding position. Mechanisms are provided for selective movement of the carriage in the forward and reverse movements between the first and second positions. Also, the first and second table devices preferably include mechanisms for independently mounting the respective table devices on the carriage for vertical up and down movement to maintain the stack of textile articles in the feeding position at a desired height as the textile articles are fed therefrom and mechanisms for selective movement of the respective table devices in the up and down directions.

A folding mechanism is positioned adjacent the stack of textile articles in the feeding position for successively receiving the textile articles and for folding the textile articles into a desired folded condition.

A robot feeding mechanism is positioned adjacent the supply mechanism and the supply stack of textile articles in the feeding position for successively picking-up the textile articles from the top of the stack in the feeding position and transporting them therefrom to the folding mechanism and releasing the textile articles.

Preferably, the robot feeding mechanism includes an end effector device for gripping the top textile article only in the stack of articles in the feeding position, holding such textile article during transportation thereof and releasing the textile article to the folding mechanism. The robot feeding mechanism also includes means carrying the end effector for at least up and down and forward and reverse paths of travel for picking up the textile article from the stack and transporting the textile article to the folding mechanism.

Thus, this invention has provided an apparatus for automatically and continuously feeding and folding successive textile articles, such as towels and the like, from a supply stack of such textile articles and has eliminated the excessive operator time and manual steps heretofore utilized in such operation.

BRIEF DESCRIPTION OF THE DRAWINGS

While some of the objects and advantages of this invention have been set forth above, other objects and advantages will appear as the detailed description of preferred embodiments of this invention continues when taken in conjunction with the accompanying drawings, in which:

FIG. 3 is a cross-sectional, somewhat schematic, view of the apparatus illustrated in FIG. 1 and taken generally along the line 3—3 of FIG. 1;

FIG. 4 is a perspective view of a folded textile article produced by the apparatus of this invention;

FIG. 9 is an enlarged front elevational view, partly in section, of one of the gripper devices utilized on the end effector mechanism of the robot feeding means and shown gripping one textile article;

FIG. 10 is a side elevational view of the gripper device shown in FIG. 9;

FIG. 11 is a bottom view of the gripper device shown in FIG. 9 and taken generally along the line 11—11 of FIG. 9;

FIG. 12 is a perspective, exploded view of two of the toothed plate members utilized in the gripper device shown in FIGS. 9-11.

DETAILED DESCRIPTION OF PREFERRED EMBODIMENT OF THE INVENTION

Figure 1:
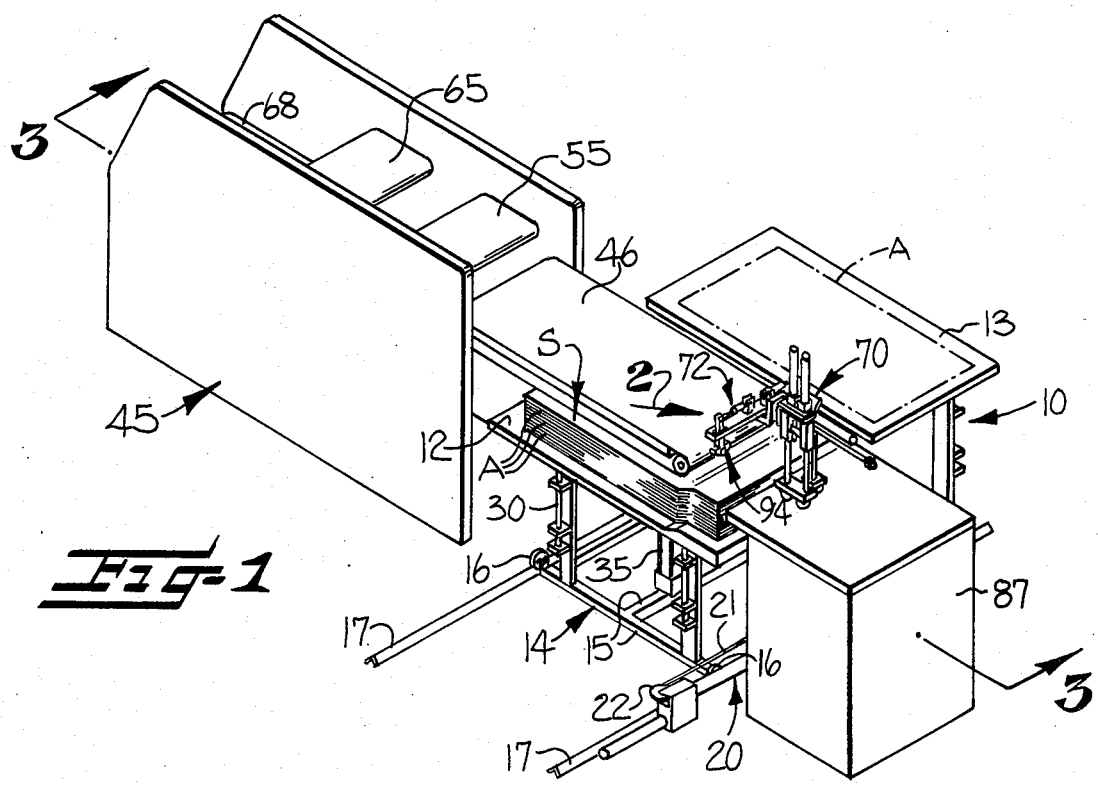
FIG. 1 is a perspective, somewhat schematic, view of an apparatus constructed in accordance with this invention.

Referring now to the drawings, there is illustrated therein a preferred embodiment of apparatus for automatically and continuously feeding and folding successive textile articles A, such as towels and the like, from a supply stack S of such textile articles A. However, it is to be understood that other embodiments of apparatus could be utilized which would employ the novel features of this invention, discussed briefly above and to be described in more detail below.

The apparatus of this invention includes a supply mechanism, broadly indicated at 10, for successively receiving a first supply stack S of textile articles A in a non-feeding position, moving the first stack S of the textile articles A into a feeding position (FIG. 1), and receiving a second supply stack S of textile articles A in a non-feeding position for being moved into the feeding position when the first stack S of textile articles A is depleted.

Figure 7:
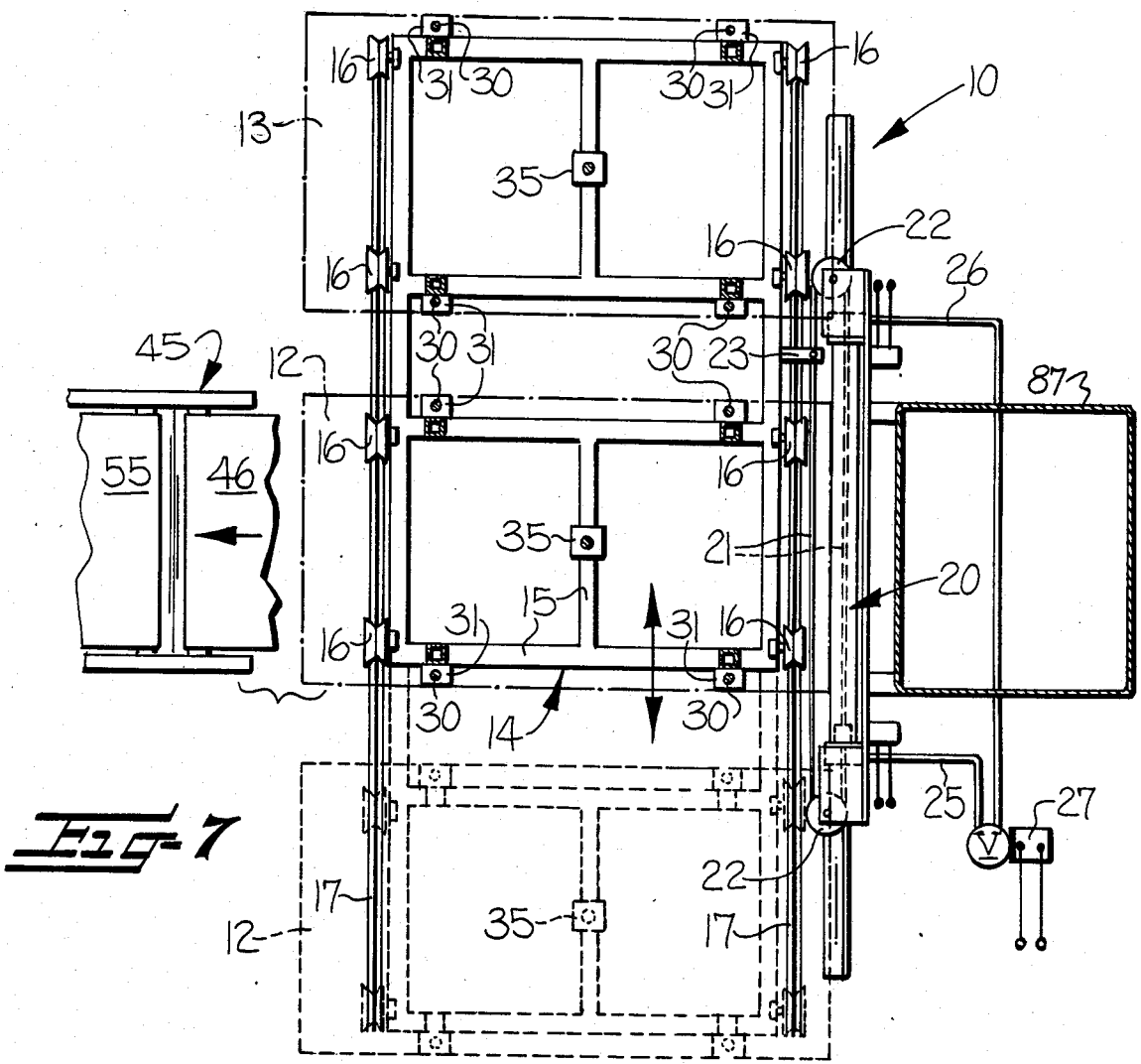
FIG. 7 is a sectional view taken generally along the line 7—7 of FIG. 3.

Preferably, the supply mechanism 10 comprises first and second table means 12, 13 for respectively receiving the supply stacks S of textile articles thereon. The table means 12, 13 are mounted on and carried together by a movable carriage 14 in side-by-side position for horizontal forward and reverse movements between a first position in which the first table means 12 and the stack S of textile articles A thereon is in a feeding position and the second table means 13 is in a non-feeding position for receipt of a stack S of textile articles (FIG. 1 and the dot dash position of FIG. 7) and a second position in which the first table means 12 is in a non-feeding position for receipt of a stack S of textile articles A (dotted line position of FIG. 7) and the second table 13 and a stack S of textile articles A placed thereon is in the feeding position.

The movable carriage 14 may be in the form of a suitable framework which is generally rectangular in its outside configuration with suitable interconnecting pieces, all of which are collectively indicated by the reference numeral 15. The carriage framework 15 is mounted on rollers 16 which ride on rails 17 for the forward and reverse movement thereof.

Means are provided for selective movement of the carriage 14 in the forward and reverse movements between the first and second positions. This means for selective movement may comprise fluid-operated piston and cylinder mechanism 20 in which the piston thereof is secured to a cable 21 mounted on suitable pulleys 22 and which is also secured by bracket 23 to the carriage framework 15. When the piston of the piston and cylinder mechanism 20 moves in its forward and reverse directions under the influence of pressurized fluid, it will carry the cable 21 to in turn move the carriage framework 15 in its forward and reverse movements. Fluid under pressure is supplied selectively to each side of the cylinder of the piston and cylinder mechanism 20 through conduits 25, 26 by a solenoid actuated valve 27.

Means are provided for independently mounting each respective table means 12, 13 on the carriage 14 for vertical up and down movement to maintain the stack S of textile articles A in the feeding position at a desired height as textile articles A are fed therefrom in a manner to be described below. Means are also provided for selective movement of the respective table means 12, 13 in the up and down direction.

The table mounting means may include guide rods 30 secured to the underside of each of the table means 12, 13 and extending downwardly through brackets 31 secured to an upstanding carriage frame member 15 positioned at generally each corner of the table means 12, 13. By this arrangement, the tables 12 and 13 may move up and downwardly by their guide rods 30 moving up and down through the brackets 31 of the upstanding carriage frame pieces 15.

The means for selective movement of the respective table means in the up and down direction may comprise piston and cylinder mechanisms 35 extending generally vertically and positioned generally centrally of the table means 12, 13. The cylinder of the piston and cylinder mechanism 35 may be attached to a carriage frame member 15 and the piston of the piston and cylinder mechanism 35 may be attached to the underside of the respective table means 12, 13. Fluid supply means in the form of conduits 37, 38 are connected to each side of the cylinder of the piston and cylinder mechanism 35 and are connected to a selectively-actuatable solenoid-operated valve 39 for being actuated to direct fluid under pressure to each side of the cylinder of the piston and cylinder mechanism 35 for effecting the up and down movement of the respective table means 12, 13.

The means for selective movement of the first and second table means 12, 13 preferably further includes sensing means 40 (FIG. 3), which may be in the form of a photoelectric cell, for sensing the height of the stack S of textile articles A in the feeding position and controlling the valve means 39 of the table means 12, 13 in the feeding position for directing fluid to the piston and cylinder mechanism 35 of the table means 12, 13 in the feeding position for upward movement of the table means 12, 13 in the feeding position as textile articles A are fed from the stack S to maintain the stack S at a desired height. Any suitable electrical control means may be connected between the sensing means 40 and the valve means 39 and such control means are not shown or described herein or believed necessary for an understanding of this invention.

The apparatus further includes folding means, generally indicated at 45, (FIGS. 1 and 3) for successively receiving the textile articles A and for folding the textile articles A into a desired folded condition (FIG. 4). This folding mechanism 45 may be any suitable commercial folding mechanism which successively receives textile articles A and folds them into a desired configuration. The particular folding mechanism 45 illustrated herein is a model D/H folding mechanism manufactured by Grantham Industries, Inc. of Los Angeles, Calif.

The folding mechanism 45 illustrated herein includes generally a driven endless conveyor 46 positioned adjacent one side of the supply mechanism 10 and the stack S of textile articles A in the feeding position for successively receiving the textile articles A which are fed from the stack S in the feeding position in a manner to be described below. The endless conveyor mechanism 46 successively conveys the articles A (FIG. 3) into the folding mechanism 45 and down a short ramp device 47 until the leading edge of the textile article A contacts an electrical switch 48 which actuates a solenoid-operated valve 49 through an electrical circuit 50 to cause pressurized fluid to flow through fluid supply conduit 51 to one side of the cylinder of piston and cylinder device 52. The piston of piston and cylinder device 52 is connected to a pivotally mounted folding blade device 53 which is moved in an upward direction to contact the article A and fold the article A transversely generally across its center line. The folding blade device 53 carries the folded edge of the article A into position between two superimposed driven endless conveyor devices 54, 55 which complete the first folding operation and convey the article A forwardly. The solenoid-actuated valve 49 would then reverse the flow of fluid to the piston and cylinder mechanism 52 causing fluid to flow through conduit 56 to the other side of the cylinder of piston and cylinder device 52 to return the folding blade device 53 to its original position.

The endless conveyors 54, 55 then convey the textile article A forwardly until it extends down another short ramp device 57 until the leading folded edge of the once folded textile article A contacts an electrical switch 58 which actuates a solenoid-operated valve 59 through electrical circuit 60. The solenoid-actuated valve 59 directs fluid under pressure through fluid supply conduit 61 to one side of the cylinder of piston and cylinder mechanism 62, the piston of which is connected to another pivotally mounted folding blade device 63 which is moved in an upwardly direction to contact the once folded textile article A transversely generally across its center line to form a second transverse fold and carry the twice folded article A into position between two superimposed driven endless conveyor mechanisms 64, 65 to complete the second fold and cover the twice folded textile article A forwardly. Solenoid-actuated valve 59 will then supply fluid under pressure through fluid supply conduit 66 to the other side of the cylinder of piston and cylinder mechanism 62 to return the folding blade device 63 to its original position.

The endless conveyor mechanisms 64, 65 will then carry the twice folded textile article A forwardly and downwardly into a position such that a driven pivotally mounted arm 66 may be activated to move in the direction of the dash dot line to remove the twice folded textile article A from the conveyor mechanism 64 and form a stack of folded textile articles A on a driven exit conveyor mechanism 68. The folded stack of textile articles A may be fed out of the folding mechanism 45 by the conveyor mechanism 68 for subsequent packaging and shipment.

Full mechanical details of the folding mechanism 45 have not been illustrated herein and are not believed to be necessary for an understanding of the present invention and, as set forth above, any commercial folding mechanism could be utilized which will fold textile articles A into a desired folded condition.

The apparatus of this invention further includes a robot feeding mechanism, generally indicated at 70, positioned adjacent the other side of the supply mechanism 10 from the folding mechanism 45 and adjacent the supply stack S of textile articles A in the feeding position for successively picking-up the textile articles A from the top of the stack S in the feeding position and transporting them therefrom to the folding mechanism 45 and releasing the textile articles A into the folding mechanism and onto the conveyor device 46.

The robot feeding mechanism 70 may be any suitable type including commercially available robot mechanism which provides devices for carrying an end effector 72 for at least up and down and forward and reverse paths of travel for picking-up the textile article A from the stack S in a vertical path of travel after gripping thereof by the end effector 72 and for transporting the textile article A to the folding mechanism 45 in a horizontal path of travel. The end effector mechanism 72 utilized with the robot mechanism 70 is especially designed in accordance with the present invention and will be described in more detail below.

The devices in the robot feeding mechanism 70 for effecting the forward and reverse paths of travel of the end effector mechanism 72 may include a guide shaft 74 carried by and mounted for horizontal movement through a frame block 75 and having a plate 76 secured to the guide rod 74 for movement therewith and with respect to the frame block 75. A fluid-operated piston and cylinder mechanism 78 has the cylinder thereof secured to the frame block 75 and the piston thereof secured to the plate 76 carried by the guide rod 74. A selectively actuatable solenoid-operated valve 79 directs fluid under pressure to one side of the cylinder of piston and cylinder mechanism 78 through fluid conduit 80 to cause the piston of piston and cylinder mechanism 78 to move forwardly in a horizontal direction which in turn carries the guide rod 74 and end effector 72 forwardly. The solenoid-operated valve 79 also selectively directs fluid under pressure through fluid conduit 81 to the other side of the cylinder of piston and cylinder mechanism 78 to cause the piston of piston and cylinder mechanism 78 to move rearwardly in a horizontal path of travel to withdraw the rod 74 and end effector 72 to its original position.

The devices in the robot feeding mechanism 70 for effecting the up and down paths of travel of the end effector 72 may include guide rods 85 which are carried on and extend vertically upwardly from a suitable table 87 for positioning the robot mechanism 70 at its desired height. The guide rods 85 extend through the robot frame block 75 so that the frame block 75 and end effector 72 may move vertically up and down along guide rods 85. Plates 86 are secured to the top of guide rods 85 and carry piston and cylinder mechanisms 88. The cylinders of piston and cylinder mechanisms 88 are secured to the top plate 86 and shafts 89 from the pistons of piston and cylinder mechanisms 88 extend through the plates 86 and are secured to the frame block 75. Fluid under pressure is directed to each side of the cylinders of piston and cylinder mechanisms 88 through fluid conduits 88a, 88b (FIG. 3) and are selectively directed by solenoid actuated valve 88c. With this arrangement, when fluid is directed through conduit 88a by solenoid-operated valve 88c, the piston shafts 89 will be extended to move the frame block 75 and end effector 72 in a downward vertical direction and when fluid is directed by the solenoid operated valve 88c through the fluid conduit 88b to the other side of the cylinders of piston and cylinder mechanisms 88, the piston shafts 89 will be retracted and the frame block 75 and end effector mechanism 72 will move upwardly in a vertical path of travel.

The robot feeding mechanism 70 further includes various damper mechanisms, adjustment devices and other features, descriptions of which are not necessary for an understanding of the present invention.

The end effector 72, which is designed in accordance with this invention for gripping the top textile article A only in the stack S of such articles in the feeding position, holding such textile article A during transportation thereof by the robot feeding mechanism 70 and releasing the textile article A to the folding mechanism 45, includes generally the following.

Figure 2:
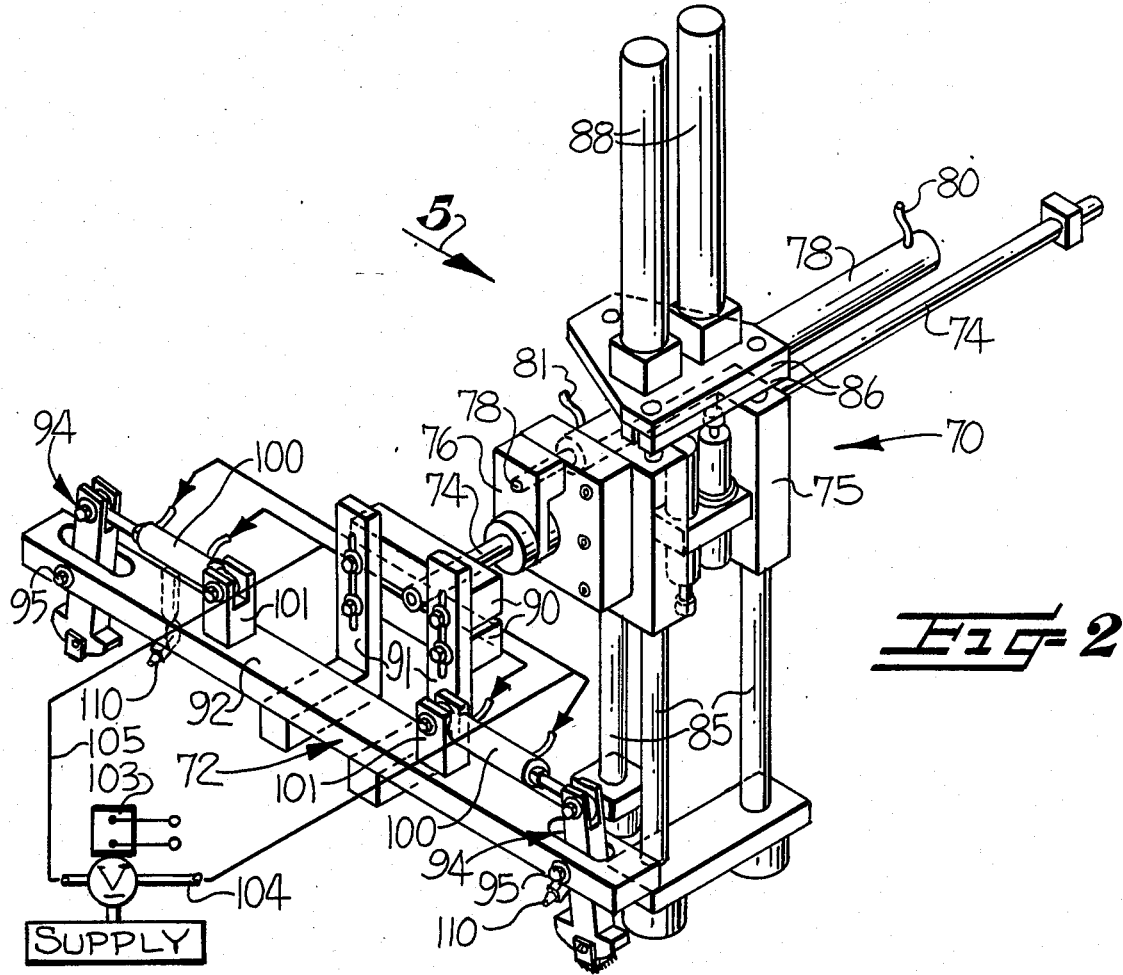
FIG. 2 is an enlarged perspective view of the robot feeding mechansim utilized in the apparatus of FIG. 1 and taken generally in the direction of the arrow 2 of FIG. 1.
Figure 5:
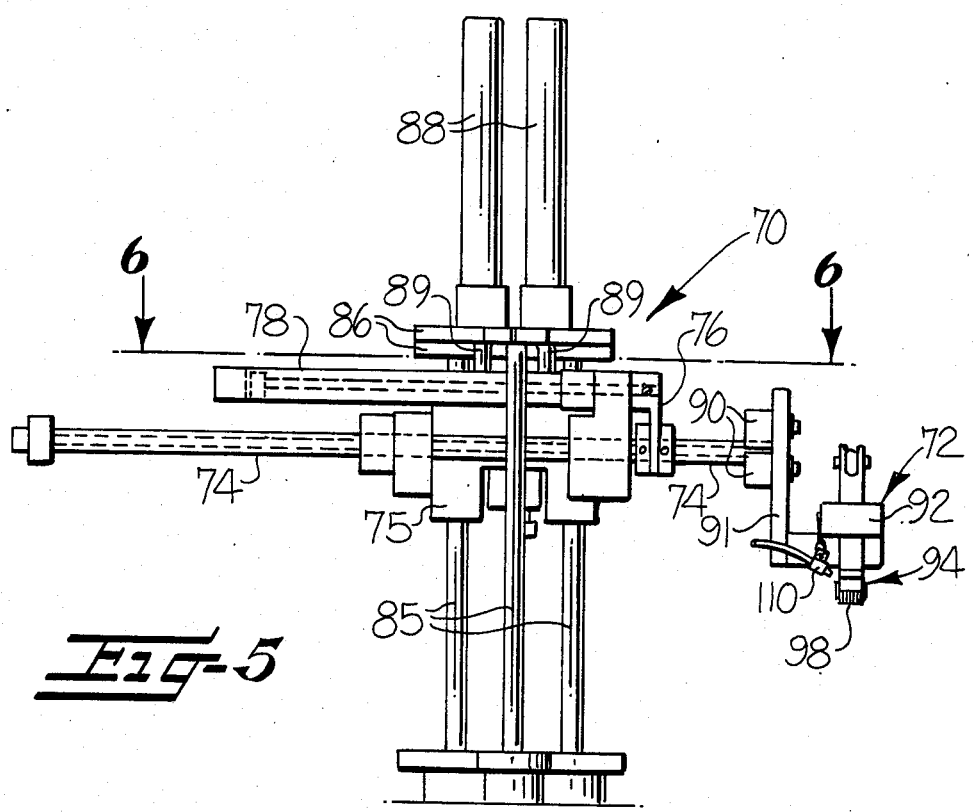
FIG. 5 is a side elevational view of the robot feeding mechanism illustrated in FIG. 2 and taken generally in the direction of the arrow 5 in FIG. 2.
Figure 6:
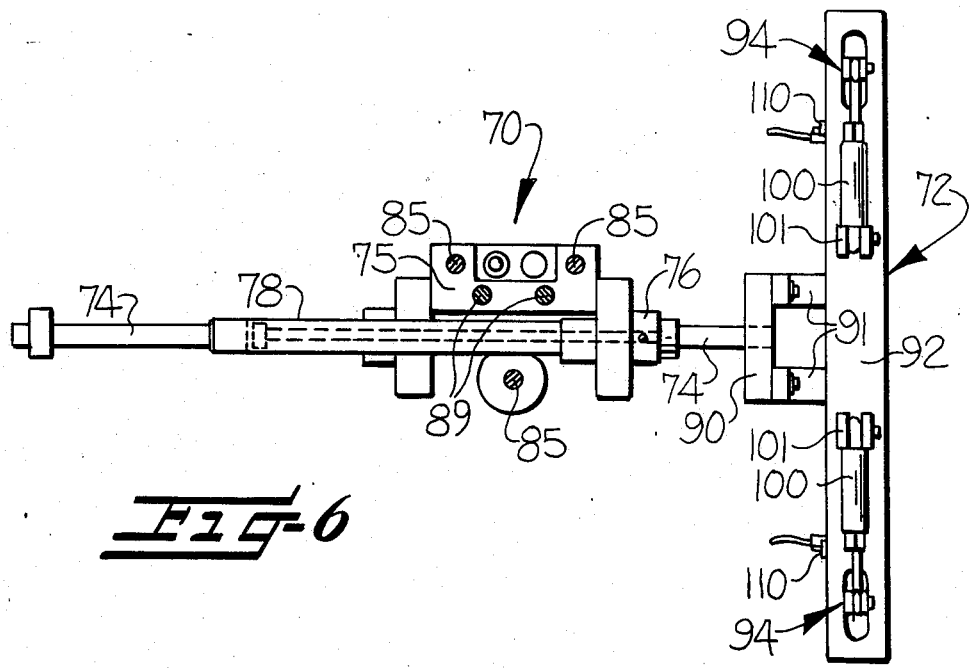
FIG. 6 is a sectional view taken generally along the line 6—6 of FIG. 5.

Bracket members 90, 91 are mounted on the front end of guide rod 74 to carry an elongate member 92 which extends generally horizontally along and over one edge portion of the textile article A on the top of the stack S in the feeding position. Two gripper devices 94 are movably carried by the elongate member 92 at respective opposite end portions (FIG. 2) and extend generally downwardly therefrom. These gripper devices 94 are pivotally mounted at 95 on the elongate member 92 for arcuate movement of lower free end portions of the gripper devices 94 (FIGS. 2 and 9) away from and toward each other for respective gripping and releasing of the textile article A being fed.

Figure 8:
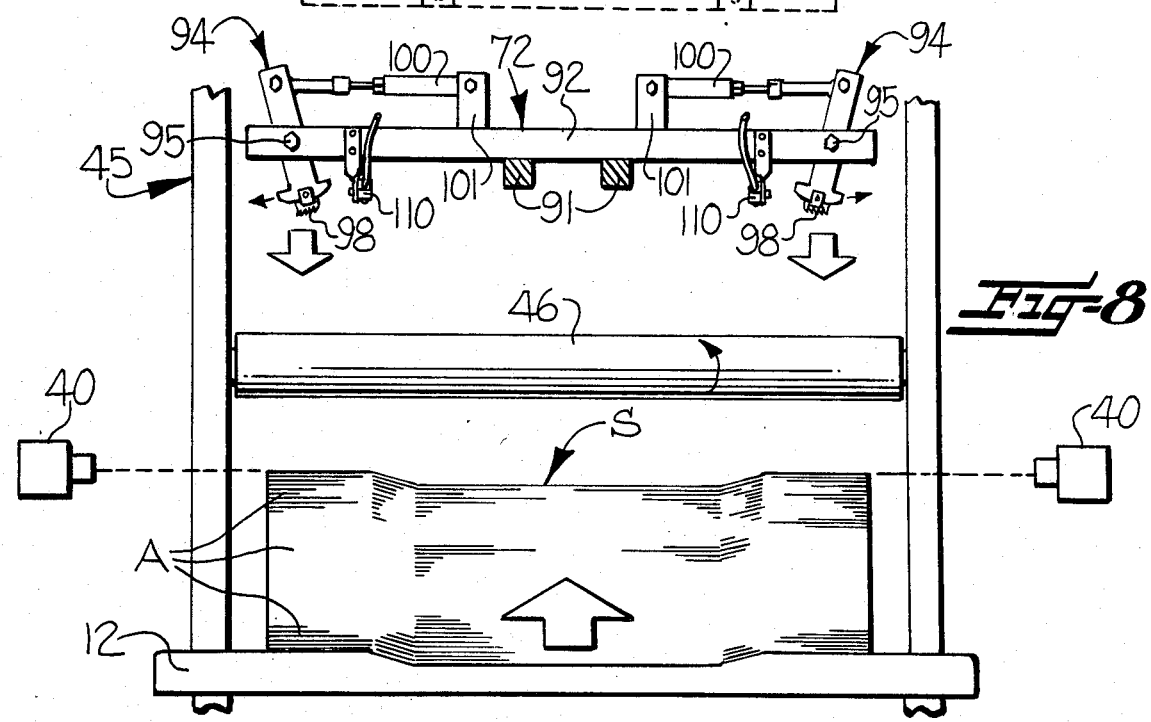
FIG. 8 is a sectional view taken generally along the line 8—8 of FIG. 3.
Figure 13:
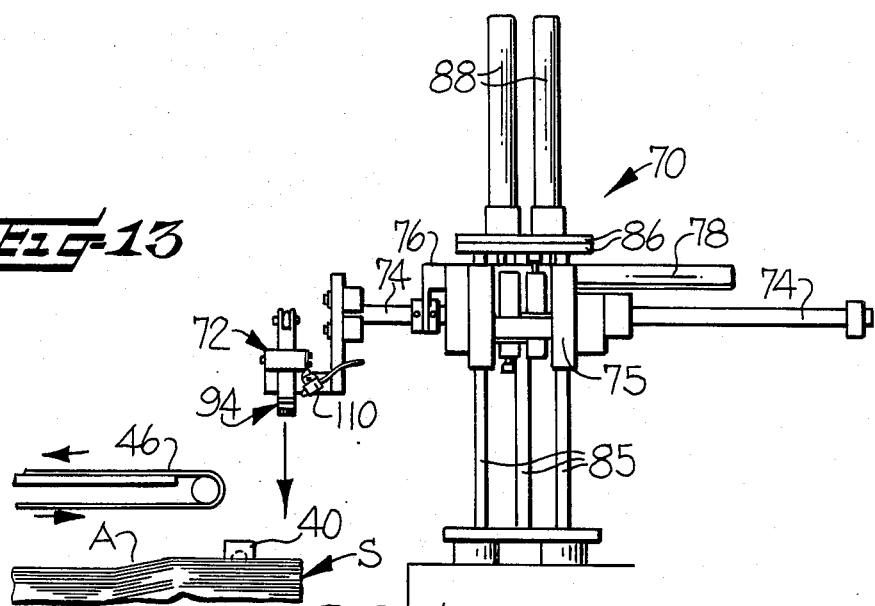
FIGS. 13-17 are sequential schematic views illustrating the robot feeding mechanism of this invention in its sequences of operations for picking-up a textile article from the top of the supply stack of textile articles in the feeding position, transporting the textile article therefrom to the folding mechanism and releasing the textile article.
Figure 14:
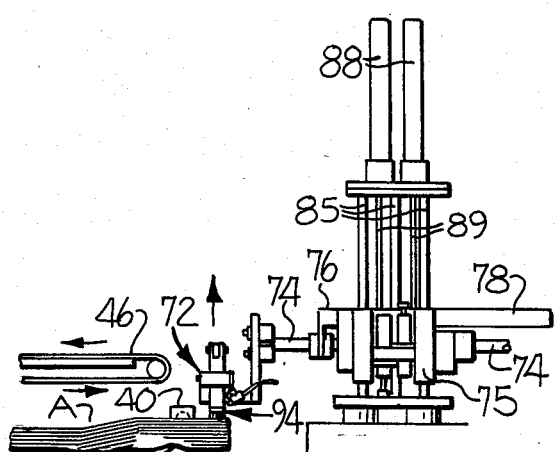

Each of the gripper devices 94 of the end effector 72 include teeth means mounted on and extending downwardly from the lower free end portions of the gripper devices 94. These teeth means are in the form of a plurality of plates 96 positioned in side-by-side arrangement and secured to the lower free end of each gripper device 94 by brackets 97. Each of the plates 96 has a plurality of outwardly-curved spaced teeth 98 extending from the bottom thereof and extending in opposite outward directions on each of the gripper devices 94 (FIG. 8) and in the direction of arcuate movement of the gripper devices 94 away from each other. The plates 96 are arranged or mounted on the bottom of each gripper device 94 such that the teeth 98 and the space therebetween alternate from one plate to the other so that the teeth 98 in one plate 96 are positioned beside the spaces between teeth 98 in adjacent plates 96. This arrangement provides a sufficient density of teeth on the bottom of each of the gripper devices 94 to aid in gripping only the top textile article A in the stack S of textile articles A in the feeding position since the density of the teeth 98 will not allow sufficient penetration of the teeth 98 through the textile article A to engage or grip more than one textile article A.

Each of the gripper devices 94 is provided with a means for selective movement of the gripper devices 94 in the respective arcuate movements away from and toward each other. This means for selective movement comprises fluid-operated piston and cylinder devices 100 in which the cylinder of the piston and cylinder devices 100 is secured to the elongate member 92 by brackets 101 and the piston of each of the piston and cylinder devices 100 is secured to the upper end of the gripper devices 94. A selectively-actuatable solenoid-operated valve 103 directs fluid under pressure to one side of the cylinder of the piston and cylinder mechanisms 100 through a fluid conduit 104 to cause outward arcuate movement of the gripper devices 94 and the teeth 98 for gripping the textile article A. The solenoid-operated valve 103 also causes the flow of fluid under pressure through fluid conduit 105 to the other side of the cylinders of the piston and cylinder mechanisms 100 to cause inward arcuate movement of the gripper devices 94 and the teeth 98 toward each other for releasing of the textile article A after it has been picked up and transported to the conveyor 46 of the folding mechanism 45 for releasing the textile article A.

The end effector 72 further includes selectively actuatable air jet devices 110 carried by depending brackets 111 from the elongate member 92 and adjacent each of the gripper devices 94 for selectively producing outwardly flowing jets of air as the gripper devices 94 of the end effector 72 release the gripped textile article A onto the conveyor 46 of the folding mechanism 45 to aid in the releasing operation and to correctly position the textile article A on the conveyor 46 of the folding mechanism 45 in a manner to be described below. The air jet devices 110 are adjustably mounted (FIGS. 9 and 10) for properly aiming the jets of air.

Figure 15:
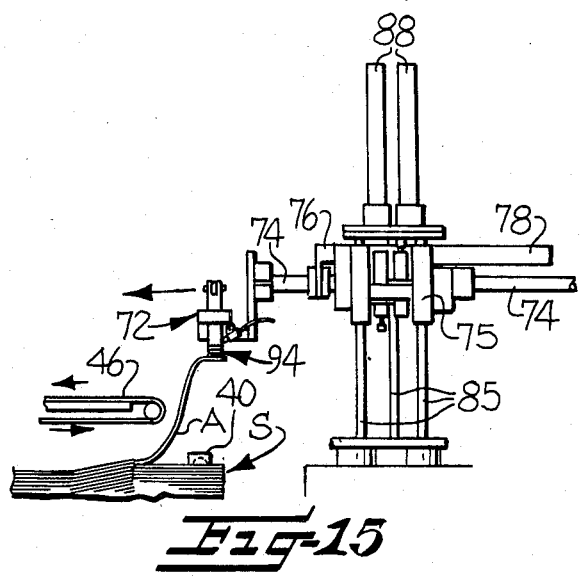
Figure 16:
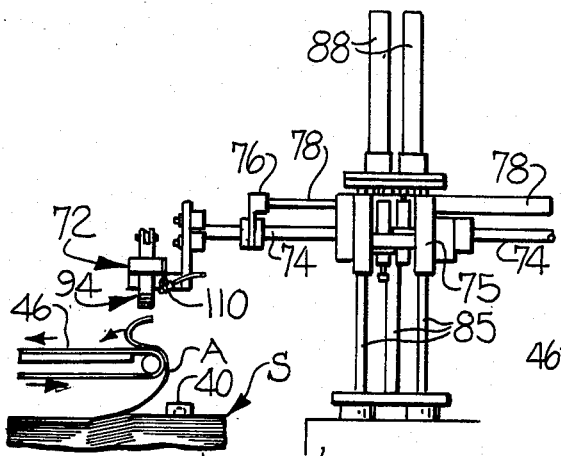
Figure 17:
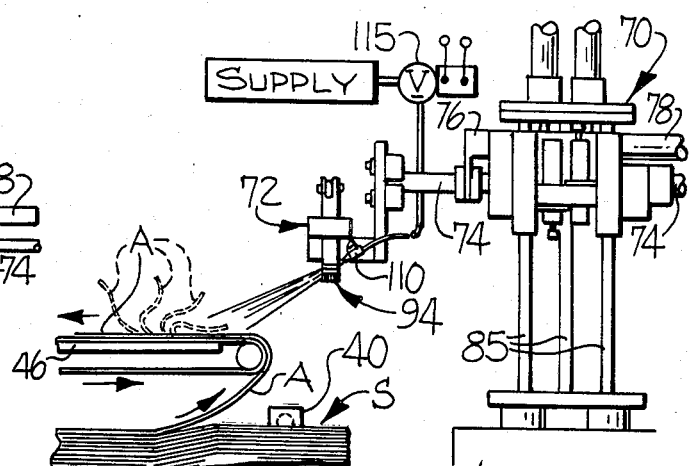

Referring now to FIGS. 13-17, there is illustrated therein a sequence of operation of the robot feeding mechanism 70 and the end effector 72 for gripping, picking up, transporting and releasing the top textile article A from the stack S in the feeding position. As may be seen in FIG. 13, the end effector 72 is moved downwardly by the robot mechanism 70 through the devices described above and into the position shown in FIG. 14. At this time, the gripper devices 94 of the end effector 72 are moved in an outward arcuate direction through the devices described above so that the teeth 98 are moved in the direction of their curvature to penetrate and grip one end of the top textile article A only in the stack of textile articles S (FIG. 9). The end effector 72 is then raised by the robot mechanism 70 through the devices discussed above from the position of FIG. 14 to the position of FIG. 15. This carries the gripped end of the textile article A upwardly and to a height higher than the conveyor 46 of the folding mechanism 45, as shown in FIG. 15. The end effector mechanism 72 is then moved forwardly from the position shown in FIG. 15 to the position shown in FIG. 16 which carries the gripped end of the textile article A over the conveyor 46 of the folding mechanism 45. The gripper mechanisms 94 of the end effector 72 and the teeth 98 thereon are then moved arcuately inwardly or toward each other by the devices described above to effect releasing of the gripped end of the textile article A to fall onto the conveyor 46 of the folding mechanism 45, as shown in FIG. 16. Simultaneously therewith, the air jets 110 are activated by solenoid-operated valve 115 which directs air under pressure to the air jets 110 to cause a flow of air in the direction of the gripped end of the textile article A which is being released. These jets of air cause the end of the textile article A which is being released to flip over onto the conveyor 46, as shown in FIG. 17. With this portion of the textile article A now being positioned on the conveyor 46 of the folding mechanism 45, the conveyor 46 may feed this textile article A completely from the top of the stack S and into the folding mechanism 45 to effect the above described folding operation.

Thus, there has been provided by this invention an apparatus for automatically and continuously feeding and folding successive textile articles A, such as towels and the like, from a supply stack S of such textile articles and has eliminated the necessity of any manual steps in such machine operation. The interconnecting controls which sequence operation the above described mechanisms of the apparatus of this invention to perform the above described functions have not been fully illustrated or described herein and are not believed necessary for full understanding of this invention. The design of such electrical controls are well within the skill of those with ordinary skill in the art.

In the drawings and specification there has been set forth a preferred embodiment of this invention and although specific terms are employed, they are used in a generic and descriptive sense only and not for purposes of limitation, the scope of the invention being defined in the following claims.

What is claimed is:

1. Apparatus for automatically and continuously feeding and folding successive textile articles, such as towels and the like, from a supply stack of such textile articles; said apparatus comprising:

supply means including first and second table means for respectively receiving first and second supply stacks of the textile articles thereon, movable carriage means carrying said two table means for movement between a first position in which said first table means is in a feeding position for feeding of the textile articles from the stack thereon and said second table means is in a non-feeding position so that a stack of textile articles may be placed thereon and a second position in which said second table means is in the feeding position for feeding of the articles from the stack thereon and said first table means is in the non-feeding position so that a stack of textile articles may be placed thereon, means connected to said carriage means for selective movement of said carriage means between the first and second positions, means independently mounting said respective table means on said carriage means for vertical up and down movement, and means connected to said table mounting means for moving said table means in the vertical direction to maintain the stack of textile articles on said table means in the feeding position at a desired height as the textile articles are fed therefrom;

folding means for successively receiving the textile articles and for folding the textile articles into a desired folded condition; and robot feeding means positioned adjacent said supply means and the supply stack of textile articles in the feeding position for successively picking-up the textile articles from the top of the stack in the feeding position and transporting them therefrom to said folding means and releasing the textile articles.

2. Apparatus, as set forth in claim 1, in which said means for selective movement of said carriage means and said means for selective movement of each of said first and second table means each comprises separate fluid-operated piston and cylinder means respectively connected to said carriage means and said first and second table means, fluid supply means connected to each side of the cylinder of each of said piston and cylinder means, and separate selectively-actuable valve means connected to said fluid supply means for selectively directing fluid to each side of the cylinder of each of said piston and cylinder means for the desired movement of said carriage means and said first and second table means.

3. Apparatus, as set forth in claim 2, in which said means for selective movement of said first and second table means further includes sensing means operatively connected to said valve means of said table means for sensing the height of the stack of textile articles in the feeding position and controlling said valve means of movement between a first position in which said first table means is in a feeding position for feeding of the textile articles from the stack thereon and said second table means is in a non-feeding position so that a stack of textile articles may be placed thereon and a second position in which said second table means is in the feeding position for feeding of the articles from the stack thereon and said first table means is in the non-feeding position so that a stack of textile articles may be placed thereon, means connected to said carriage means for selective movement of said carriage means between the first and second positions;

folding means for successively receiving the textile articles and for folding the textile articles into a desired folded condition; and robot feeding means positioned adjacent said supply means and the supply stack of textile articles in the feeding position for successively picking-up the textile articles from the stack of articles in the feeding position in said supply means and transporting the articles to said folding means and releasing the articles and including end effector means for gripping the top textile article only in the stack of articles in the feeding position and holding such textile article during transportation thereof and releasing the textile article to said folding means and including an elongate member mounted on said robot means to extend generally horizontally along and over one edge portion of the textile article on the top of the stack in the feeding position and two gripper devices movably carried by said elongate member at respective opposite end portions and extending downwardly therefrom and means pivotally mounting each of said gripper devices on said elongate member for arcuate movement of lower free end portions of said gripper devices away from and toward each other for respective gripping and releasing of the textile article being fed, means connected on said gripper means for selective movement of said gripper devices in their respective arcuate movements, and means carrying said end effector means and for moving said end effector means in at least up and down and forward and reverse paths of travel to pick-up the textile article from the stack and transport the textile article to said folding means.

5. Apparatus, as set forth in claim 1 or 4, in which said folding means includes conveyor means positioned adjacent the other side of said supply means and the stack of textile articles in the feeding position for successively receiving the textile articles from said robot feeding means and conveying the textile articles into said folding means.

6. Apparatus, as set forth in claim 4, in which said of said teeth in adjacent plates alternate to provide a sufficient density of teeth on each of said gripper devices to aid in gripping only the top textile article in the stack of textile articles in the feeding position.

8. Apparatus, as set forth in claims 4, 6 or 7, in which said means for selective movement of said gripper devices comprises fluid-operated piston and cylinder means connected to said gripper devices, fluid supply means connected to each side of the cylinder of said piston and cylinder means, and selectively-actuatable valve means connected to said fluid supply means for selectively directing fluid to each side of the cylinder of said piston and cylinder means for the desired arcuate movement of said gripper devices.

9. Apparatus, as set forth in claim 8, in which said end effector means further includes selectively actuatable pneumatic means operatively connected with said end effector means for producing outwardly flowing jets of air as said end effector means releases the gripped textile article to aid in the releasing operation into said folding means.

10. Apparatus for automatically and continuously feeding and folding successive textile articles, such as towels and the like, from a supply stack of such textile articles; said apparatus comprising:

supply means comprising first and second table means for respectively receiving supply stacks of textile articles thereon, movable carriage means carrying said two table means together in side-by-side position for horizontal forward and reverse movement between a first position in which said first table means and the stack of textile articles thereon is in a feeding position and said second table means is in a non-feeding position for receipt of a stack of textile articles and a second position in which said first table means is in a non-feeding position for receipt of a stack of textile articles and said second table means and the stack of textile articles thereon is in the feeding position, means independently mounting said respective table means on said carriage means for vertical up and down movement to maintain the stack of textile articles in the feeding position at a desired height as textile articles are fed therefrom, means connected to said carriage means for selective movement of said carriage means in the forward and reverse movements between the first and second positions, and means connected to said table mounting means for selective movement of said respective table means in the up and down movements;

folding means for successively receiving the textile articles and for folding the textile articles into a desired folded condition and including conveyor means positioned adjacent one side of said supply means and the stack of textile articles in the feeding position for successively receiving the textile articles and conveying the textile articles into said folding means; and robot feeding means positioned adjacent said supply means and the stack of textile articles in the feeding position for successively picking-up the textile articles from the top of the stack of said table means in the feeding position and transporting them therefrom to said conveyor means of said folding means and releasing the textile articles onto said conveying means, said robot feeding means including an end effector means for gripping the top textile article only in the stack of articles on said table means in the feeding position, holding such textile article during transportation thereof and releasing the textile articles to said conveyor means of said folding means, and means carrying said end effector means and for moving said end effector means in at least up and down and forward and reverse paths of travel.

11. Apparatus, as set forth in claim 10, in which said end effector means comprises an elongate member mounted on said robot means to extend generally horizontally along and over one edge portion of the textile article on the top of the stack on said table means in the feeding position, two gripper devices movably carried by said elongate member at respective opposite end portions and extending generally downwardly therefrom, teeth means mounted on and extending downwardly from the free end portions of said gripper devices and defining an outwardly curved tooth configuration extending in opposite outward directions on said gripper devices, means pivotally mounting each of said gripper devices on said elongate member for arcuate movement of the downwardly-extending free end portions and the teeth means on said gripper devices away from and toward each other for respective gripping and releasing of the textile article being fed, and means for selective movement of said gripper devices in their respective arcuate movements.

12. Apparatus, as set forth in claim 11, in which said teeth means on each of said gripper means comprise a plurality of plates mounted side-by-side and each having a plurality of outwardly curved spaced teeth extending from the bottom thereof and being arranged such that the spacing between said teeth and the positioning of said teeth in adjacent plates alternate to provide a sufficient density of teeth on each of said gripper devices to aid in gripping only the top textile article in the stack of textile articles on said table means in the feeding position.

13. Apparatus, as set forth in claim 12, in which said means for selective movement of said carriage means, said means for selective movement of each of said first and second table means and said means for selective movement of said gripper devices each comprise separate fluid-operated piston and cylinder means respectively connected to said carriage means, said first and second table means and said gripper devices, fluid supply means connected to each side of the cylinder of each of said piston and cylinder means, and separate selectively-actuatable valve means connected to said fluid supply means for selectively directing fluid to each side of the cylinder of each of said piston and cylinder means for the desired movement of said carriage means, said first and second table means and said gripper devices.

14. Apparatus, as set forth in claim 13, in which said means for selective movement of said first and second table means further includes sensing means operatively connected to said valve means of said table means for sensing the height of the stack of textile articles in the feeding position and controlling said valve means of said table means in the feeding position for directing fluid to said piston and cylinder means for upward movement of said table means in the feeding position as the textile articles are fed from the stack to maintain the stack at a desired height.

15. Apparatus, as set forth in claim 14, in which said end effector means further includes selectively actuatable pneumatic means operatively connected with said end effector means for producing outwardly flowing jets of air as said end effector means releases the gripped textile article to aid in the releasing operation of the textile article onto said conveyor of said folding means.

* * * * *